US008700751B2

(12) United States Patent
Banerjee et al.

(10) Patent No.: US 8,700,751 B2
(45) Date of Patent: Apr. 15, 2014

(54) OPTIMIZING FIBRE CHANNEL ZONESET CONFIGURATION AND ACTIVATION

(75) Inventors: Subrata Banerjee, Los Altos, CA (US); Badrinarayanan Ramaswamy, Saratoga, CA (US); Harsha Bharadwaj, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 748 days.

(21) Appl. No.: 12/509,415

(22) Filed: Jul. 24, 2009

(65) Prior Publication Data

US 2011/0022691 A1 Jan. 27, 2011

(51) Int. Cl.
*G06F 15/16* (2006.01)
(52) U.S. Cl.
USPC .......................................... 709/221; 709/220
(58) Field of Classification Search
USPC ................................................. 709/220, 221
See application file for complete search history.

(56) References Cited

U.S. PATENT DOCUMENTS

| 7,167,472 | B2 * | 1/2007 | Wu et al. ....................... 370/389 |
| 7,657,597 | B2 * | 2/2010 | Arora et al. ................... 709/206 |
| 2005/0076138 | A1 | 4/2005 | Sterne |

OTHER PUBLICATIONS

Managing Flogi, Name Server, FDMI, and RSCN Databases, Cisco Systems, downloaded Mar. 2009 available on the Web at http://www.cisco.com/en/US/docs/switches/datacenter/nexus5000/sw/configuration/guide/cli_rel_4_0_1a/flgi.pdf.
Configuring and Managing Zones, Cisco Systems, downloaded Mar. 2009 available on the Web at http://www.cisco.com/en/US/docs/storage/san_switches/mds9000/sw/rel_3_x/configuration/guides/fm_3_3_1/zone.pdf.
RFC4936—Fibre Channel Zone Server MIB, Aug. 2007 available on the Web at http://www.faqs.org/rfcs/rfc4936.html.

\* cited by examiner

*Primary Examiner* — Adnan Mirza
(74) *Attorney, Agent, or Firm* — Fish & Richardson P.C.

(57) ABSTRACT

In an example embodiment, a new qualifier is added to members in a Fiber Channel zone to specify whether each member is a target or initiator and in another embodiment a time-range attribute is added to a zone in the zoneset. When the zoneset is applied the number of ACL entries that must be programmed is reduced from k×(k−1) entries to 2(k−1) entries for a zone with k members where k−1 members are of one type (e.g. initiators) and one of the members is of a different type (e.g., a tape device). The time-range attribute is enforced by zone server software and enhances security by, for example, limiting access to sensitive data to specified times. In another embodiment, an incremental zoneset activation protocol is implemented where a hash of a zoneset is created by a switch updating the zoneset and the hash and ID of the switch updating the zoneset are sent to all other switches in the fabric when the zoneset is propagated. The hash and switch ID are stored in persistent storage at all switches in the fabric. When a target zoneset is updated by a source switch only the incremental change is propagated to other switches in the fabric along with the hash and switch ID of the target zoneset. Each switch checks a received hash and switch ID against its stored hash and switch ID to assure that the stored local zoneset is the same as the target zoneset before applying the incremental change.

23 Claims, 6 Drawing Sheets

OPTIMIZING FIBRE CHANNEL ZONESET CONFIGURATION AND ACTIVATION

TECHNICAL FIELD

The present disclosure relates generally to configuration and activation of Fibre Channel zonesets and more particularly to reducing the complexity of Access Control List (ACL) configuration and zoneset updating protocols and allowing enhanced security by enforcing a time-span attribute.

BACKGROUND OF THE INVENTION

A storage area network (SAN) attaches remote storage devices to servers. Fibre Channel is one type of SAN and has become the SAN most used for enterprise networks. Zoning is a fabric management service included in the Fibre Channel protocol that can be used to create logical subsets of devices within a Storage Area Network and enables the partitioning of resources for the management and access control of frame traffic between ports. If a zone including a selected number of ports is set up and activated then communication through any port in the zone is only allowed with other ports in the zone.

Fibre Channel zones are created to increase network security and prevent data loss or corruption. For example, it may be desirable to screen off certain devices on a fabric in order to perform testing and/or maintenance activities on only those devices without the risk of interfering with the other devices on the fabric. Devices may need to be segregated according to their operating system or other technical features, certain devices may wish to receive only frames using a certain protocol, or access to or by certain devices may need to be restricted for security reasons. Additionally, the system may wish to monitor the characteristics of individual frames being sent within the fabric. A Fibre Channel zone may be implemented by programming Access Control Lists (ACLs) at the ports in the Fibre Channel zone. The ACL at a particular port is programmed to allow access only to other ports in a defined Fibre Channel zone.

DESCRIPTION OF EXAMPLE EMBODIMENTS

Overview

Figure 1:
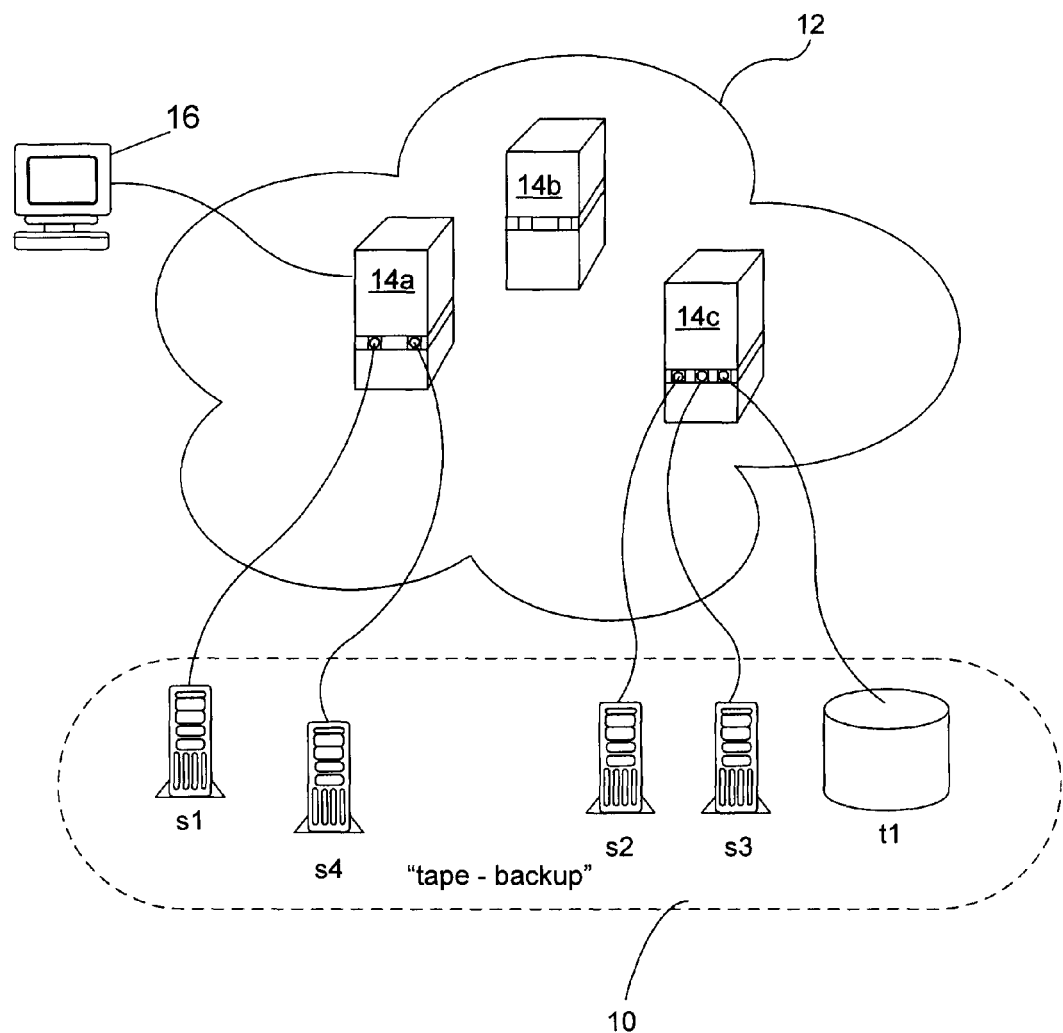
FIG. 1 illustrates an example Fibre Channel zone coupled to a fabric.

In an example embodiment zone server software is executed to access a first zone member of a Fibre Channel zone, where each zone member is assigned an attribute value indicating whether the zone member is a target or an initiator and, to compare the attribute of a current zone member, having its access control list (ACL) being programmed by an ACL software module, with the attribute value of the first zone member.

The ACL software module is executed to program an ACL entry for the current zone member allowing access to the first zone member if the attribute value of the first zone member is different from the attribute value of the current zone member.

In another example embodiment access control list (ACL) software is executed to access a start time value of a time-range attribute of a first Fibre Channel zone, compare an accessed start time value to a global time value, program ACL entries from memory for ports included in the first Fibre Channel zone only if the accessed start time value is greater than the global time value, access a finish time value of the time-range attribute, compare an accessed finish time value to the global time value, and remove ACL entries from memory for ports included in the first Fibre Channel zone only if the global time value is greater than the accessed finish time value.

A first network device has a port coupled to a Fibre Channel network and the first network device receives a delta value specifying changes to a first zoneset, with the first zoneset identified by a first ID value stored at all network devices having ports included in the first zoneset, applies the delta value to the first zoneset to generate an updated first zoneset, calculates a second ID value being an ID value for the updated first zoneset, stores the second ID value at the first network device, and transmits the delta, the first ID value and second ID value to a second network device having a port coupled to the Fibre Channel network.

The second network device receives the delta value, the first ID value and the second ID value, compares the first ID value to an ID value stored at the second network device to verify that a zoneset active on the second network device is the first zoneset, applies the delta to the zoneset active on the second network device to generate the updated first zoneset if the second network device verifies that its active zoneset is the first zoneset, and stores the second ID value at the second network device.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, embodiments may be practiced without some or all of these specific details. In other instances, well known process operations have not been described in detail in order not to unnecessarily obscure the present disclosure. Further, each appearance of the phrase an "example embodiment" at various places in the specification does not necessarily refer to the same example embodiment.

FIG. 1 depicts an example of a Fibre Channel zone 10 where servers s1, s2, s3, and s4 all back up to a backup tape unit t1. In this example the Fibre Channel fabric 12 includes first, second and third switches 14*a*-*c* (connections between switches in the fabric are not shown). The storage administrator uses the user interface 16 of the first switch 14*a* to log onto the zone server to create a Fibre Channel zone with members [s1, s2, s3, s4, and t1]. In this example the zone name is "tape-backup" and the zone includes: Member s1, Member s2, Member s3, Member s4, and Member t1 where s1, s2, s3 and s4 are servers and t1 is the tape backup unit.

The use of the zone server and techniques for enforcing the zone will be described with reference to FIG. 2, which illustrates in greater detail the first switch 14a illustrated in FIG. 1. The switch includes a supervisory card 20 and linecards 22. The supervisory card 20 and linecards 22 include a processing apparatus 29 described more fully below. The line cards 22 have ports which are interconnected to form the Fibre Channel fabric 12 and first and second ports 24a and b used to couple host devices to the fabric where, in this example, servers s1 and s4 are coupled to the first and second ports 24a and b on the linecard 22. The user interface 16 is coupled to the supervisory card 20.

The processing apparatus of the supervisory card 20 and the linecards 22 includes a memory module 30 and a CPU 32. The linecard also includes a Ternary Content Addressable Memory (TCAM) 34 and a filter 38. In this example the TCAM stores Access Control Lists (ACLs) 40. The supervisory 20 card and linecards 22 communicate over a backplane (not shown) in the switch.

The zone manager of a fabric is used to create a zone by specifying the zone members and giving the zone a name. The zone manager is a distributed application running on all switches 14a-c that share a common distributed data base. In the switch depicted in FIG. 2 the zone manager would run on the supervisory card 20. A group of zones can be collected into a zoneset and the collection of zones can be activated or deactivated across all switches in a fabric. Only one zoneset can be active at a time and each switch in the fabric has a copy of the zonesets configured for the fabric.

In an example embodiment, an activated zoneset is enforced through the use of Access Control Lists (ACLs). The switches in the fabric receive Fibre Channel frames at ports on line cards. A switch can contain numerous line cards, each of which can have a number of ports. In this example, each port has an associated access control list (ACL) stored on the line card within a Ternary Content Addressable Memory (TCAM). An ACL is a set of rules to be applied to frames in order to filter unwanted frames or perform other actions on frames such as counting or copying. When a frame arrives through a port, the switch extracts specific fields from the frame and searches the ACL associated with the port for a rule. If a rule is found, the filter 38 applies the action associated with the rule to the frame.

The application of a selected zoneset will now be described. The zoneset server passes information to an ACL module which determines the rules to be applied at each port of the fabric coupled to a host or a target. The ACL module is a distributed application with instance (ACL-LC) running on each line card. The ACL-LC programs ACL entries into the TCAMs of the various ports to enforce the selected zoneset.

Figure 2:
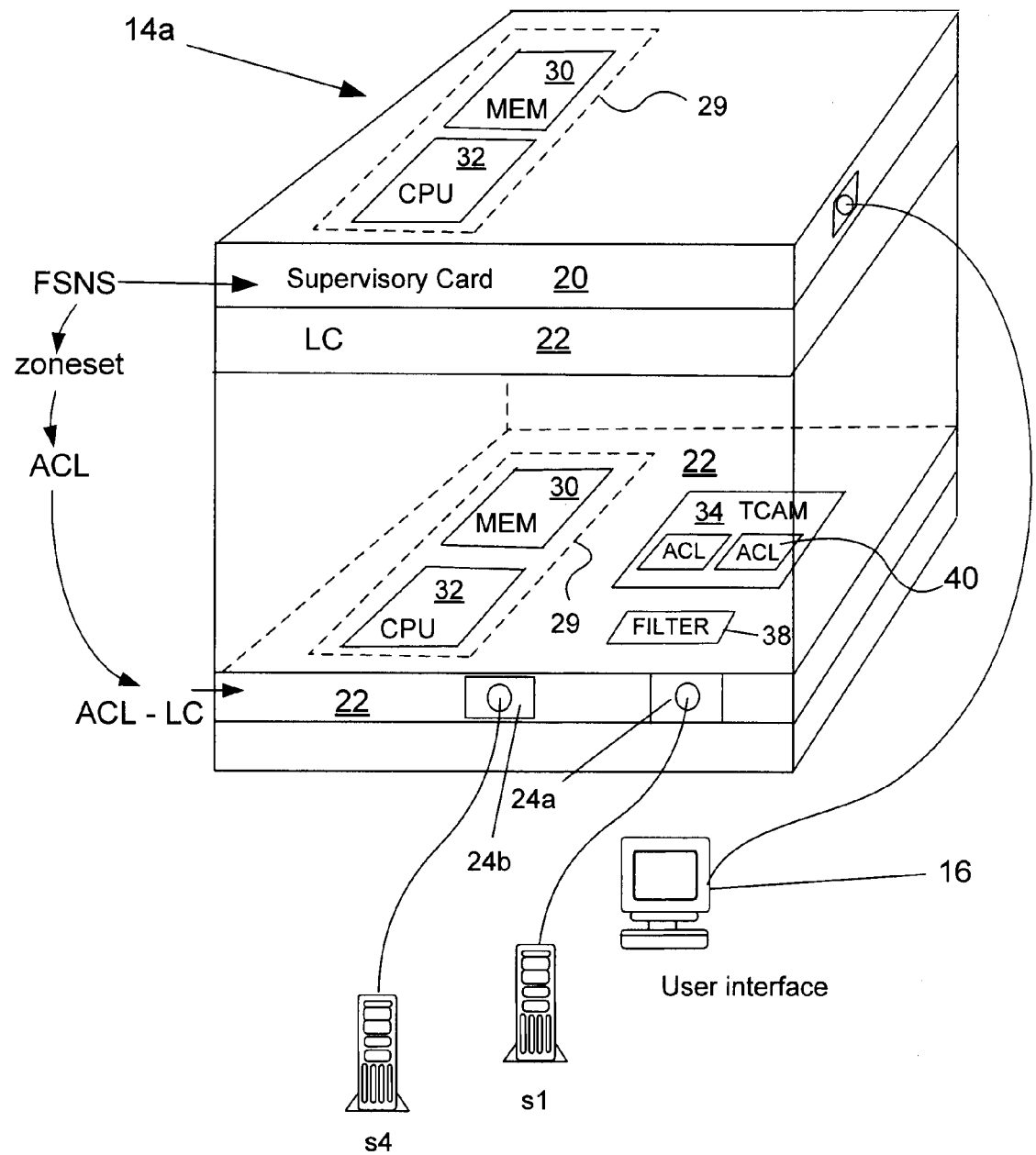
FIG. 2 illustrates an example switch included in the fabric.

In the example of FIGS. 1 and 2, access by s1 to other members of an active zone is controlled by an access control list (ACL) associated with the first port 24a. The ACL-LC module running on the linecard programs permit entries into the ACL at the first port to allow s1 to access other devices that are members of an active zoneset and share a common zone with s1.

In this example, the administrator has logged onto the zone server and created a zone named "tape-backup" including four servers that back up to a tape. When creating tape-backup the administrator logs onto any switch, for example the first switch 14a of FIG. 1, to access the zone server which is a distributed application. The user interface may be a command line interface (CLI) or a Fabric Manager graphical user interface. The administrator names the new zone (tape-backup) and enters the IDs of the members of the "tape-backup" zone.

The administrator is typically fully aware of the types of devices that are being zoned together, that is, the administrator knows that s1-s4 are servers and t1 is a tape. Although tape-backup has s1-s4 and t1 as its members, servers s1-s4 so not need to talk amongst themselves. However, using standard techniques the ACL entries would be programmed to permit traffic between the servers since the ACL firmware cannot deduce that the servers are not going to talk amongst themselves.

In this standard technique of zone configuration each member of the zone can communicate with all other members of the zone. Consider a Fibre Channel zone with members m1, m2 and m3. In order to enforce this zone in hardware ACL permit entries have to be programmed in hardware (typically some form of Ternary Content Addressable Memory (TCAM) by the ACL firmware module. These ACLs are programmed at the ports where m1, m2 and m3 are directly connected to the fabric. So the ACL entries programmed at the port to which m1 is connected would be "permit m1 to m2" and "permit m1 to m3". Similar entries are programmed at the ports where m2 and m3 are attached. Six ACL entries in total need to be programmed to enforce this zone.

In general, for a zone with k members $k \times (k-1)$ ACL entries need to be programmed. Moreover, software has to generate and process that many pairs of programmed entries. Typically the zones that have more than two members have one target and multiple initiators. So for the "tape-backup" zone of FIG. 1 there are five members (k=5) in the zone and each member must set up ACL entries for the other four (k−1) members of the zone. So it is required to set up 5×4=20 ACL entries to enforce the "tape backup" zone.

An alternative way of specifying this zone that would not waste ACLs would be to create four zones instead of one as [s1, t1], [s2, t1], [s3, t1], and [s4, t1]. However this is not usually done because it requires more configuration steps and it would not be as easy to find out from the zone configuration which servers can back up to tape t1.

An example embodiment will now be described that alters the standard Fibre Channel zoning technique. In this example embodiment, the number of ACL entries required to enforce a zone with k members is reduced from $k \times (k-1)$ to $2(k-1)$. This is an order of magnitude improvement. For example, in the "tape-backup" zone the number of ACL entries that must be programmed is reduced from 20 entries to 8 entries and for a zone with 10 members the number of entries which must be programmed is reduced from 90 entries to 18 entries.

In an example embodiment the zone server is modified so that an additional qualifier may be specified for each zone member when the zone is created. The qualifier indicates whether the zone member is a target, i.e., a storage device, or an initiator, i.e., a server or other host. An example of a zone configuration input for the zone described above is:

Zone name tape-backup
    Member s1 initiator
    Member s2 initiator
    Member s3 initiator
    Member s4 initiator
    Member t1 target When this additional qualifier is available in the zone configuration, the firmware can save ACLs by not programming them for pairs of devices of the same type (i.e., both initiators or both targets).

Figure 3:
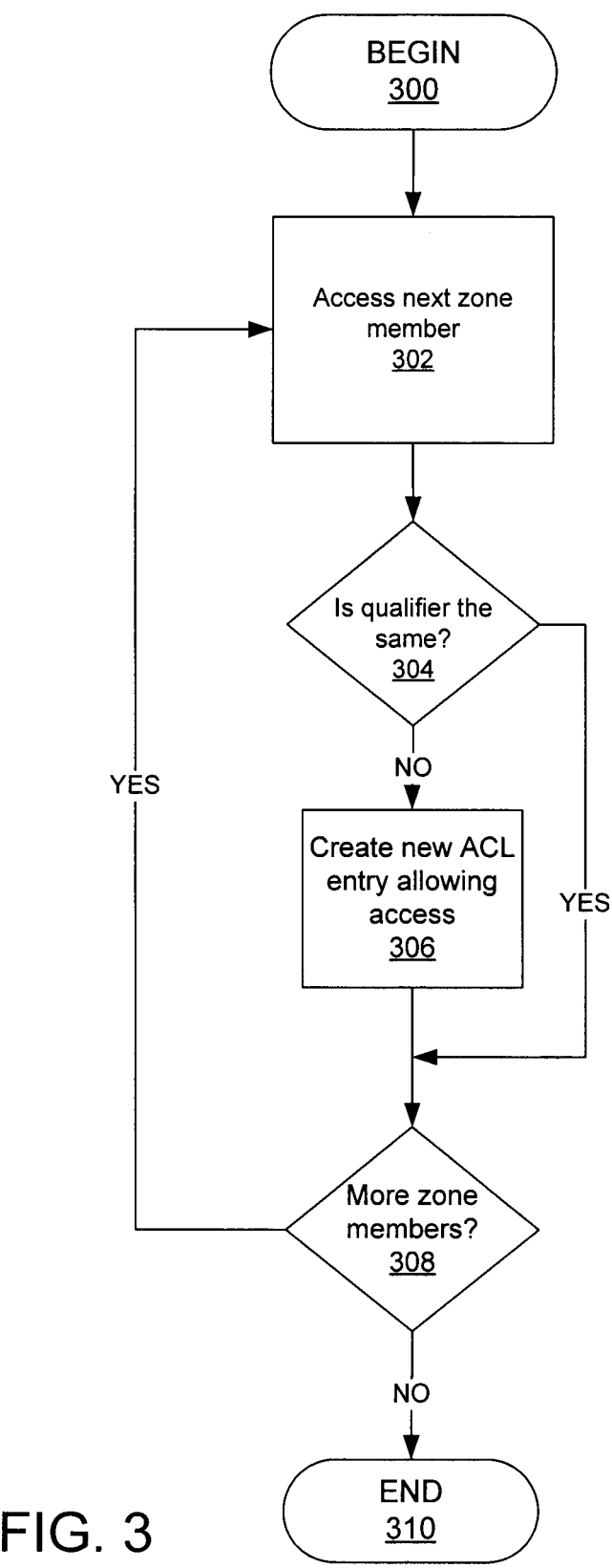
FIG. 3 illustrates an example algorithm for programming ACL entries.

The ACL firmware is modified to program the ACL entries at each port so that each initiator is only allowed access to the target, not to the other initiators. An example algorithm for programming the ACL entries is illustrated in the flow chart of FIG. 3. In process block 300 the ACL module starts to program the ACL entries for a particular member of the zone. In process block 302 the next member in the zone is accessed and in process block 304 it is determined whether the target/initiator qualifier for the next member is the same is the particular member. If YES then no ACL entry is created and processing proceeds to block 308. If NO then an ACL entry is written allowing access from the particular member to the current next member and processing proceeds to processing block 308. In processing block 308 it is determined whether there are further members to be processed. If YES than processing returns to processing block 302 and if NO then processing proceeds to processing block 310 where the ACL entry creating process is ended.

Accordingly, the ACL for the port coupled to s1 would have a new entry "permit s1 to t1", the ACL for the port coupled to s2 would have a new entry "permit s2 to t1", the ACL for the port coupled to s3 would have a new entry "permit s3 to t1", the ACL for the port coupled to s4 would have a new entry "permit s4 to t1" and the ACL for the port coupled to t1 would have four new entries programmed allowing access to each of the servers. Only eight new ACL entries are required. In this example, by default, if no zone member qualifier is specified then it is assumed that the member could be either an initiator or a target or both.

Note that it is not possible to conclusively deduce the qualifier type, e.g., initiator or target, from the vendor information, such as from the Organizationally Unique Identifier (OUI) in the port world wide name (pwwn,) provided by a device during the fabric log in (FLOGI) and stored in the Fibre Channel Name Server database. For example if a host (HostA) is connected by PortA to the fabric then (FLOGI) protocol is executed. A FLOGI server receives parameters from HostA and updates a field for the host in the Fibre Channel Name Server data base. HostA will not be able to access the fabric until it receives its Fibre Channel ID (FCID). During login an identifier of the HostA, e.g., it pwwn-id, is forwarded to the zone server which examines the zoneset data base to determine to which targets HostA is allowed access. After the ACL for PortA has been programmed the zone server notifies the FLOGI server and the FLOGI server issues a Fibre Channel ID (FCID) to HostA. HostA then provides its vendor information because the vendor information was not available when the ACL for HostA was programmed.

In another example embodiment a time-range attribute is added to the zone configuration. Many data centers require secure access to storage, and limiting access to certain designated times can improve security. One solution would have two zonesets, one for normal operations and another for backup. This example requires active administration to activate and deactivate the different zonesets where only one zoneset would be active at a time.

In this example embodiment an optional time-range specification is added as an attribute of a Fibre Channel zone. Some platforms already support read-only and quality-of-service as attributes of Fibre Channel zones. In this example, time range would be an additional optional attribute of the zone.

A user can set up a zone to be effective when a backup session starts and make it ineffective when the backup session ends. Current state of the art does not allow for a time range specification for Fibre Channel zones. The tape-backup zone with time-range attribute would be as follows:

Zone name tape-backup
    Attribute time-range backup-window
    Member s1 initiator
    Member s2 initiator
    Member s3 initiator
    Member s4 initiator
    Member t1 target Backup-window is a time-range name that can be specified as "every Sunday 1AM-5AM", for example.

In this example, the ACL firmware is modified to periodically check a global time value. If the time value is within the time-range specified by the time-range attribute than the ACL entries allowing devices in the zone to communicate with each other are programmed into the ports coupling the zone members to the fabric. When the global time value is outside of the specified time range the ACL firmware reprograms the port ACLs to remove the ACL entries allowing communication between the zone members.

Figure 4:
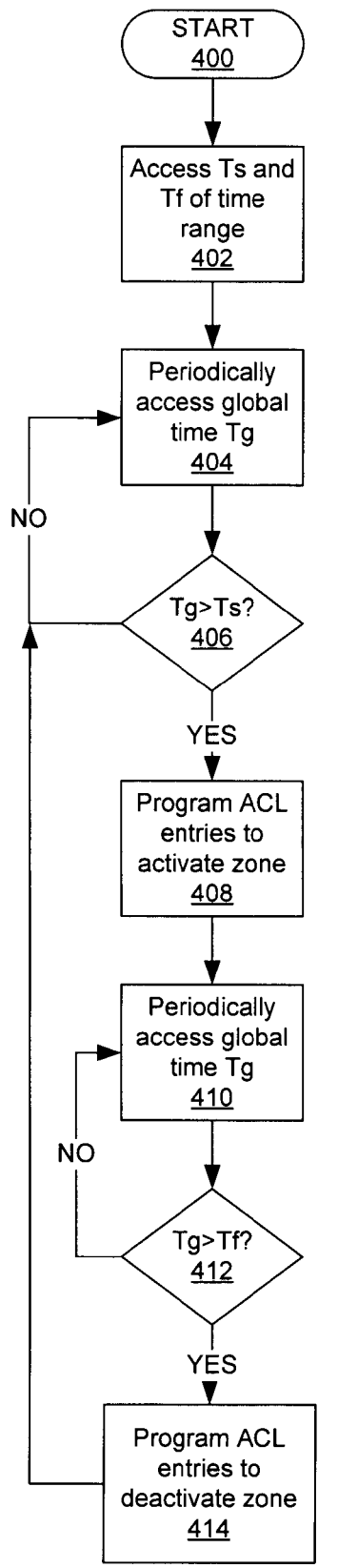
FIG. 4 illustrates an example algorithm for enforcing a time-range attribute.

An example algorithm for enforcing the time range is illustrated in the flow chart of FIG. 4. The algorithm starts in processing block 400 and in processing block 402 accesses a start time (Ts) and a finish time (Tf) of the time range to be enforced. In processing block 404 a global time value (Tg) is accessed and in processing block 406 it is determined whether Tg is greater than Ts. If NO processing returns to processing block 404 or if YES proceeds to processing block 408 where the ACL entries to enforce the zone are programmed at the ports coupled to members of the zone. Processing proceeds to processing block 410 where the global time is periodically accessed and to processing block 412 where it is determined whether Tg is greater than Tf. If NO the processing returns to processing block 410 and if YES proceeds to processing block 414 where the ACL entries enforcing the zone are removed. Processing then returns to processing block 404.

In another example embodiment, a zoneset may be changed incrementally to save processing time and reduce bandwidth consumption. Many commercial users have large SANs and may have, for example, an active zoneset with 2,000 zones and 5,000 zone members. If the administrator adds a single zone with two zone members to the zoneset then the fabric is locked down while the entire new zoneset is propagated to all the switches in the fabric. The switches then must compare their existing zoneset to the new zoneset and program new ACL entries to enforce the new zoneset before releasing the fabric for use.

In an example embodiment only the incremental change to the zoneset needs to be communicated from the switch where the new zone is configured.

Prior to incrementing the zoneset the active zoneset is the same at all the switches in the VSAN so if each switch applies the same delta to the zoneset all switches would have the same new active zoneset after the delta is applied. However the zoneset may be stored in different formats at the different switches. Current state of the art does not allow for zoneset activation via incremental addition or deletion of zones.

In an example embodiment, an active zoneset has a new attribute which uniquely identifies the zoneset. This attribute is added by the switch which creates the currently active zoneset. The attribute has two parts. The first part of the attribute is a unique identifier of a zoneset such as an MD5 hash signature of the zoneset or a checksum calculated from the zoneset by the switch which creates the zoneset. The second part of the attribute is an identifier, e.g., the pwwn, of the switch which created the active zoneset. All switches store this information in the persistent storage along with the active zoneset itself.

The administrator logs onto a source switch to change the zoneset by a delta, being either a zone to be added to the zoneset, a zone to be deleted from the zoneset or a change to a zone included in the zoneset. In this example the stage fabric configuration protocol sends the delta, an attribute indicating how the delta is to be applied, i.e., "added", "removed", or "unchanged", and the zoneset signature and the switch identity of the zone currently active in the source switch.

At the recipients of the change, the received zoneset signature and switch identity are compared to the locally stored zoneset signature and switch identity to assure that the current zoneset to which the delta is to be applied is the same as the current zoneset at the source switch.

Figure 5:
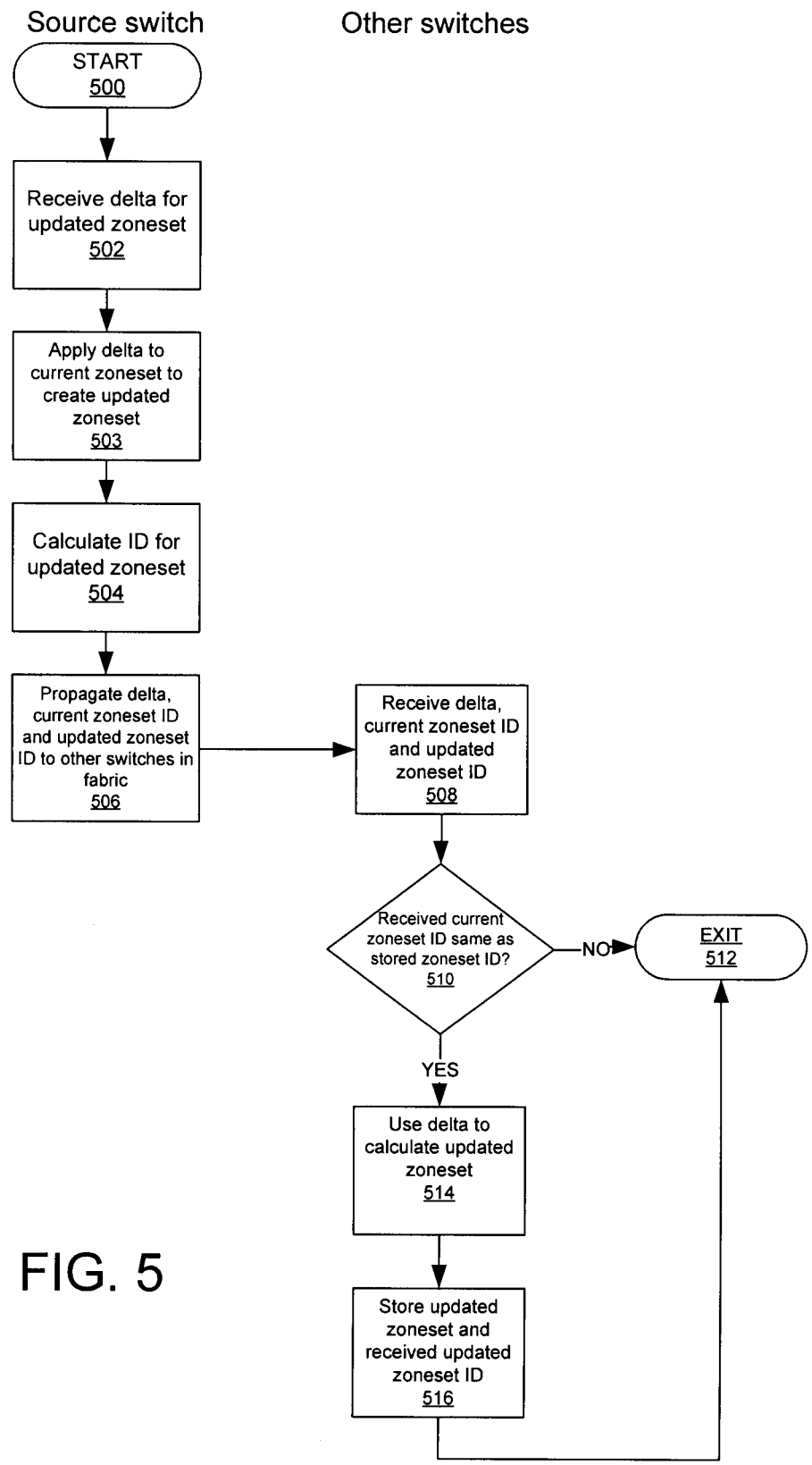
FIG. 5 illustrates an example algorithm for incrementally updating a zoneset.

FIG. 5 is a flowchart illustrating an example algorithm for incrementally changing a zoneset. The process starts at processing block 500 and at processing block 502 a delta is received at the source switch. In processing block 503 the delta is applied to the current zoneset at the source switch to form the updated zoneset. In processing block 504 the ID for the updated zoneset is calculated. In processing block 506 the delta, the ID for the current zoneset and the ID for the updated zoneset are propagated from the source switch to the other switches in the fabric.

In processing block 508 the delta, the ID for the current zoneset and the ID for the updated zoneset are received at other switches in the fabric. In processing block 510 each switch determines whether the received zoneset ID for the current zoneset is the same as the stored zoneset ID. If NO then the process exits at processing block 512 and the standard technique of propagating the entire zoneset is performed. If YES then it is confirmed that the current zoneset is stored at the switch and processing proceeds to processing block 514 where the delta is applied to the current zoneset to form the updated zoneset. In processing block 516 the updated zoneset and updated zoneset ID are stored at the switch and the process is exited at processing block 512.

Note that, since MD5 or similar hash would depend on the order in which the zones and its members are stored, the hash is computed only at the originating switch and other switches refer to it to make sure that they are referring to the same zoneset that is currently active. If a switch in the fabric does not have the same stored zoneset signature and switch identifier then that switch can reject the incremental zone activation. In that case the entire zoneset (after applying the delta to the currently active zoneset) would be sent along with the switch pwwn of the source switch (switch from which the activation is initiated) and the new MD5 hash. Then the subsequent activations can be done in an incremental way.

Figure 6:
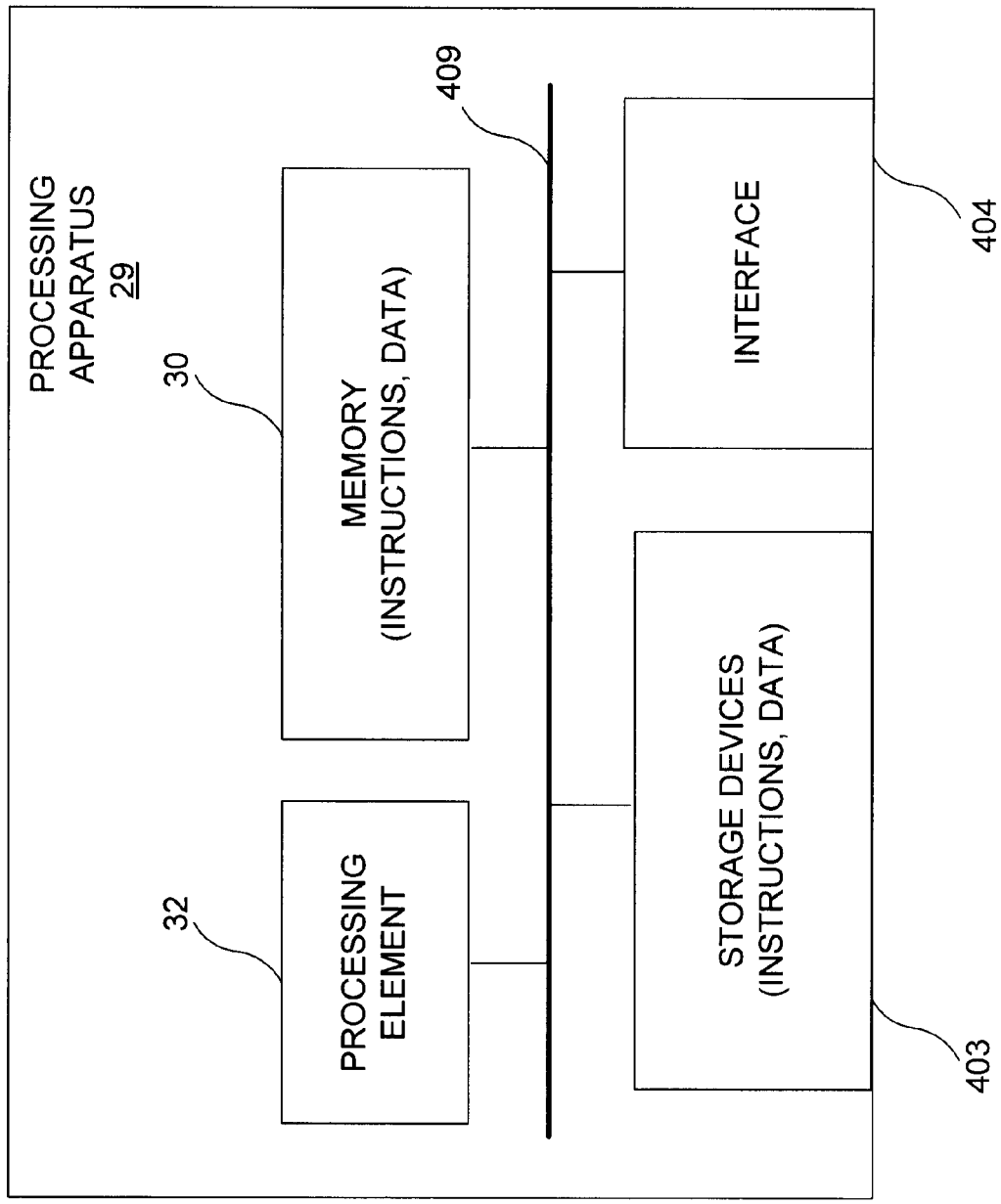
FIG. 6 illustrates an example processing apparatus.

FIG. 6 is a block diagram of an example processing apparatus 29. In one embodiment, processing apparatus 29 performs one or more processes corresponding to one of the flow diagrams illustrated or otherwise described herein.

In one embodiment, processing apparatus 29 includes the processing element 32 (e.g., a processor, customized logic, etc.), the memory 30, storage devices 403, and an interface 404 for receiving and sending packets, items, and/or other information. These elements are typically coupled via one or more communications mechanisms 409 (shown as a bus for illustrative purposes). Various embodiments of processing apparatus 29 may include more or fewer elements.

The operation of processing apparatus 29 is typically controlled by processing element 32 using memory 30 and storage devices 403 to perform one or more scheduling tasks or processes. Memory 30 is one type of computer-readable medium, and typically comprises random access memory (RAM), read only memory (ROM), flash memory, integrated circuits, and/or other memory components. Memory 30 typically stores computer-executable instructions to be executed by processing element 32 and/or data which is manipulated by processing element 32 for implementing functionality in accordance with the algorithms described in FIGS. 3-5. Storage devices 403 are another type of computer-readable medium, and typically comprise solid state storage media, disk drives, diskettes, networked services, tape drives, and other storage devices. Storage devices 403 typically store computer-executable instructions to be executed by processing element 32 and/or data which is manipulated by processing element 32 for implementing functionality in accordance with the described example embodiments.

The invention has now been described with reference to the example embodiments. Alternatives and substitutions will now be apparent to persons of skill in the art. Accordingly, it is not intended to limit the invention except as provided by the appended claims.

What is claimed is:

1. A method comprising:
   executing zone server software to:
   access a first zone member from a group of zone members in a Fibre Channel zone, where each zone member in the group of zone members is assigned a first attribute value indicating whether the zone member is a target or an initiator and a second attribute value indicating a time-range in which the Fibre Channel zone is operational, the target configured as a storage device and the initiator configured as a hosting device; and
   compare the attribute of a second zone member, with the first attribute value of the first zone member to determine whether the first zone member and the second zone member have different first attribute values;
   determine that the group of zone members is active and that other groups of zone members are not active; and
   executing an access control list (ACL) software module to:
   based on determining that the group of zone members is active and that other groups of zone members are not active, program an ACL entry for the second zone member to access the first zone member during a particular time based upon (i) the first attribute value of the first zone member being different from the first attribute value of the second zone member and (ii) the time-range in which the Fibre Channel zone is operational.

2. The method of claim 1 where the target is a backup tape drive unit.

3. The method of claim 2 where the initiators are servers that back up data to the tape drive unit.

4. The method of claim 1 further comprising:
   executing the ACL software module to:
   program an ACL entry for the current zone member allowing access to the first zone member if no attribute value is specified for the first zone member.

5. A method comprising:
   executing access control list (ACL) software to:
   access a start time value and a finish time value of a time-range attribute of a first Fibre Channel zone;
   compare an accessed start time value to a global time value;
   program ACL entries that enforce the First Fibre Channel zone from memory for ports included in the first Fibre Channel zone only if the accessed start time value is greater than the global time value;
   access the finish time value of the time-range attribute;
   compare the finish time value to the global time value; and
   remove the ACL entries that enforce the First Fibre Channel zone from memory for ports included in the first Fibre Channel zone only if the global time value is greater than the finish time value.

6. The method of claim 5 further comprising:
setting the start time value and finish time value to define a limited access period for security purposes.

7. A method comprising:
at a first network device in a Fibre Channel fabric, with the first network device having a port coupled to a Fibre Channel network:
receiving a delta value specifying changes to a first zoneset, with the first zoneset identified by a first ID value stored at all network devices having ports included in the first zoneset;
applying the delta value to the first zoneset to generate an updated first zoneset;
calculating a second ID value being an ID value for the updated first zoneset;
storing the second ID value at the first network device; and
transmitting the delta value, the first ID value, and second ID value to other network devices including a second network device having a port coupled to the Fibre Channel network; and
at the second network device:
receiving the delta value, the first ID value, and the second ID value;
comparing the first ID value to an ID value stored at the second network device to verify that a zoneset active on the second network device is the first zoneset;
applying the delta to the zoneset active on the second network device to generate the updated first zoneset based on the second network device verifying that the zoneset active on the second network device is the first zoneset; and
storing the second ID value and the updated first zoneset at the second network device.

8. The method of claim 7 where calculating the second ID value comprises:
applying a hashing algorithm to the updated first zoneset.

9. The method of claim 8 where applying a hashing algorithm comprises:
applying an MD5 hashing algorithm.

10. The method of claim 7 where calculating the second ID value comprises:
calculating a checksum of the updated first zoneset.

11. The method of claim 7 further comprising:
with the first network device, sending an attribute value specifying how the delta is to be applied.

12. The method of claim 11 where the attribute value is either "added", "removed" or "unchanged".

13. An apparatus comprising:
a first port which is a first zone member of a Fibre Channel zone, with each zone member of the Fibre Channel zone assigned an attribute value indicating whether the zone member is a target or initiator;
a content-addressable-memory (CAM) holding access control list (ACL) entries for the first port;
a memory holding program code for executing zone server software and ACL software and holding data, where the zone server software and ACL software are distributed applications executing on network device having ports included in the first Fibre Channel zone; and
a processor configured to execute program code stored in the memory and to program or remove ACL entries in the CAM, with the processor further configured to execute zone server software to access a second zone member, compare the attribute value of the second zone member to the attribute value of the first zone member, determine that the first zone member and the second zone member are active and that other zone members are not active, and to execute the ACL software to program an ACL entry for the first port allowing access to the second zone member if the attribute value of the first port is different from the attribute value of the second port.

14. The apparatus of claim 13 where the first port is coupled to a tape drive that functions to backup other members of the Fibre Channel zone which are servers.

15. The apparatus of claim 13 where the first port is coupled to a server and the only ACL entry programmed allows the first port to access a tape drive backup unit.

16. The apparatus of claim 13 with the processor further configured to execute program code stored in memory to:
program an ACL entry for the first port allowing access to the second zone member if no attribute value is specified for the second zone member.

17. An apparatus comprising:
a first port which is a first zone member of a Fibre Channel zone which is part of a zoneset, with the zoneset characterized by a time-range attribute having a start time and a finish time;
a content-addressable-memory (CAM) holding access control list (ACL) entries for the first port;
a memory holding program code for executing ACL software and holding data where the zone server software and ACL software are distributed applications executing on network devices having ports included in the first Fibre Channel zone; and
a processor configured to execute program code stored in the memory and to program or remove zoneset ACL entries that enforce the first Fibre Channel zone in the CAM, with the processor further configured to execute ACL software to access the start time, compare the start time to a global time, and program zoneset ACL entries into the CAM only if the start time is greater than the global time and with the processor configured to access the finish time, compare the finish time to the global time and remove the zoneset ACL entries that enforce the first Fibre Channel zone based on the global time being greater than the finish time.

18. An apparatus comprising:
a port which is a member of a Fibre Channel zoneset and coupled to network devices included in a Fibre Channel fabric;
a memory storing a first zoneset, a current zoneset ID, and zone server software; and
a processor, coupled to the memory, configured to execute zone server software to compare a received updated current zoneset ID received at the port to the current zoneset ID stored in the memory and to apply a received delta received at the port to the current zoneset stored in memory to generate an updated current zoneset and store the received updated current ID and the updated current zoneset in memory based on the received updated current zoneset ID and the current zoneset ID stored in memory being the same.

19. The apparatus of claim 18 with the processor further configured to:
execute zone server software to receive a delta specifying a change to the first zoneset, to apply the delta to the first zoneset to generate an updated first zoneset, to calculate an updated zoneset ID, and to propagate the delta and updated zoneset ID through the port to other network devices included in the Fibre Channel network.

20. The apparatus of claim 18 with the processor further configured to:

process a received attribute value specifying how the delta is to be applied.

21. Software encoded in one or more non-transitory computer readable media and when executed operable to:
  access a first zone member from a group of zone members in a Fibre Channel zone, where each zone member in the group of zone members is assigned a first attribute value indicating whether the zone member is a target or an initiator and a second attribute value indicating a time range in which the Fibre Channel zone is operational, the target configured as a storage device and the initiator configured as a hosting device; and
  compare the first attribute of a second zone member, with the first attribute value of the first zone member to determine whether the first zone member and the second zone member have different first attribute values;
  determine that the group of zone members is active and that other groups of zone members are not active; and
  based on determining that the group of zone members is active and that other groups of zone members are not active, program an access control list (ACL) entry for the second zone member to access the first zone member during a particular time based upon (i) the first attribute value of the first zone member being different from the first attribute value of the second zone member and (ii) the time-range in which the Fibre Channel zone is operational.

22. Software encoded in one or more non-transitory computer readable media and when executed operable to:
  access a start time value and a finish time value of a time-range attribute of a first Fibre Channel zone;
  compare an accessed start time value to a global time value;
  program ACL entries that enforce the First Fibre Channel Zone from memory for ports included in the first Fibre Channel zone only if the accessed start time value is greater than the global time value;
  access the finish time value of the time-range attribute;
  compare the finish time value to the global time value; and
  remove the ACL entries that enforce the First Fibre Channel Zone from memory for ports included in the first Fibre Channel zone only if the global time value is greater than the finish time value.

23. Software encoded in one or more non-transitory computer readable media and when executed operable to:
  receive a delta value at a first network device in a Fibre Channel fabric having a first port coupled to a Fibre Channel network, with the delta value specifying changes to a first zoneset, with the first zoneset identified by a first ID value stored at all network devices having ports included in the first zoneset;
  apply the delta value to the first zoneset to generate an updated first zoneset;
  calculate a second ID value being an ID value for the updated first zoneset;
  store the second ID value at the first network device; and
  transmit the delta value, the first ID value and second ID value to other network devices including a second network device having a port coupled to the Fibre Channel network;
  receive the delta value, the first ID value and the second ID value at a second network device having a port coupled to the Fibre Channel network;
  compare the first ID value to an ID value stored at the second network device to verify that a zoneset active on the second network device is the first zoneset;
  apply the delta to the zoneset active on the second network device to generate the updated first zoneset based on the second network device verifying that the zoneset active on the second network device is the first zoneset; and
  store the second ID value and the updated first zoneset at the second network device.

\* \* \* \* \*